United States Patent
Swinson et al.

(10) Patent No.: US 11,334,911 B1
(45) Date of Patent: May 17, 2022

(54) SYSTEMS AND METHODS FOR DEBIASING MEDIA CREATIVE EFFICIENCY

(71) Applicant: Tatari, Inc., San Francisco, CA (US)

(72) Inventors: Michael D. Swinson, Santa Monica, CA (US); Wei Chen, Santa Monica, CA (US)

(73) Assignee: TATARI, INC., San Francisco, CA (US)

(*) Notice: Subject to any disclaimer, the term of this patent is extended or adjusted under 35 U.S.C. 154(b) by 0 days.

(21) Appl. No.: 16/360,456

(22) Filed: Mar. 21, 2019

Related U.S. Application Data

(60) Provisional application No. 62/647,402, filed on Mar. 23, 2018.

(51) Int. Cl.
 *G06Q 30/00* (2012.01)
 *G06Q 30/02* (2012.01)

(52) U.S. Cl.
 CPC ..... *G06Q 30/0246* (2013.01); *G06Q 30/0247* (2013.01); *G06Q 30/0249* (2013.01)

(58) Field of Classification Search
 None
 See application file for complete search history.

(56) References Cited

U.S. PATENT DOCUMENTS

| | | |
|---|---|---|
| 8,386,310 B2 | 2/2013 | Weyer |
| 8,510,770 B1 | 8/2013 | Oztaskent |
| 8,762,201 B1 | 6/2014 | Noonan |
| 9,852,163 B2 * | 12/2017 | Srivastava ............ G06F 16/215 |
| 10,467,653 B1 | 11/2019 | Avedissian |

(Continued)

FOREIGN PATENT DOCUMENTS

| | | |
|---|---|---|
| GB | 2550839 | 12/2017 |
| WO | WO 2014011139 | 1/2014 |
| WO | WO 2020005240 | 1/2020 |

OTHER PUBLICATIONS

Eisenberg et al., "SQL:2003 Has Been Published", Mar. 2004, ACM.org, SIGMOD Record, vol. 33, No. 1 (Year: 2004).*

(Continued)

*Primary Examiner* — Naresh Vig
(74) *Attorney, Agent, or Firm* — Sprinkle IP Law Group

(57) ABSTRACT

A quantification system is configured for debiasing media creative efficiency. In some embodiments, the quantification system leverages a weighted generalized linear model (GLM) to determine the individual impacts of media creatives beyond network effects. To prepare input data for fitting the weighted GLM, the quantification system analyzes spot airing data, creates a specific data structure for storing observations (e.g., network-media creative combinations) that can be provided to the weight GLM as input, and computes additional input data points needed by the weighted GLM (e.g., network spend, media creative efficiency per network-media creative combination, etc.). The weighted GLM is then fitted to obtain coefficients representing the individual impacts of the media creatives. The quantification system utilizes the computed impacts to adjust the previously computed media creative efficiency for each media creative. In this way, relative performance of media creatives can be objectively quantified across networks without needing digital evidence.

20 Claims, 5 Drawing Sheets

(56) References Cited

U.S. PATENT DOCUMENTS

| | | | |
|---|---|---|---|
| 10,497,021 B1 | 12/2019 | Eberstein | |
| 11,132,706 B1 | 9/2021 | Swinson | |
| 11,212,566 B1 | 12/2021 | Swinson | |
| 2007/0174114 A1 | 7/2007 | Bigby | |
| 2008/0004884 A1 | 1/2008 | Flake | |
| 2008/0082381 A1 | 4/2008 | Muller | |
| 2008/0235089 A1 | 9/2008 | Weyer | |
| 2008/0255904 A1 | 10/2008 | Park | |
| 2008/0256061 A1* | 10/2008 | Chang | G06Q 30/0244 |
| 2009/0006188 A1 | 1/2009 | Guo | |
| 2009/0049468 A1 | 2/2009 | Shkedi | |
| 2009/0172728 A1 | 7/2009 | Shkedi | |
| 2009/0254420 A1* | 10/2009 | Curd | G06Q 30/02 705/7.29 |
| 2010/0082424 A1 | 4/2010 | Yemeni | |
| 2010/0228593 A1 | 9/2010 | Belwadi | |
| 2010/0287029 A1 | 11/2010 | Dodge | |
| 2011/0087546 A1 | 4/2011 | Fordyce | |
| 2011/0119126 A1 | 5/2011 | Park | |
| 2011/0167145 A1 | 7/2011 | Bush | |
| 2011/0231245 A1 | 9/2011 | Bhatia | |
| 2011/0246297 A1 | 10/2011 | Buchalter | |
| 2011/0302022 A1 | 12/2011 | Fordyce | |
| 2012/0054019 A1 | 3/2012 | Kitts | |
| 2012/0072997 A1 | 3/2012 | Carlson | |
| 2012/0096489 A1 | 4/2012 | Shkedi | |
| 2012/0109749 A1 | 5/2012 | Subramanian | |
| 2012/0158505 A1 | 6/2012 | Jaladanki | |
| 2012/0303414 A1 | 11/2012 | Dodge | |
| 2013/0046621 A1 | 2/2013 | Asseoff | |
| 2013/0117454 A1 | 5/2013 | Rangarajan | |
| 2013/0261482 A1 | 10/2013 | Marziliano | |
| 2013/0268357 A1 | 10/2013 | Heath | |
| 2014/0006158 A1 | 1/2014 | Cooper | |
| 2014/0012659 A1* | 1/2014 | Yan | G06Q 30/0241 705/14.42 |
| 2014/0040020 A1 | 2/2014 | Shanmugam | |
| 2014/0082664 A1 | 3/2014 | Shkedi | |
| 2014/0100947 A1 | 4/2014 | Kitts | |
| 2014/0164101 A1 | 6/2014 | S | |
| 2014/0222549 A1 | 8/2014 | Bruich | |
| 2014/0223458 A1 | 8/2014 | Smith | |
| 2014/0236705 A1 | 8/2014 | Shao | |
| 2014/0244368 A1 | 8/2014 | Singhania | |
| 2014/0257979 A1 | 9/2014 | Luke | |
| 2014/0289004 A1 | 9/2014 | Monforte | |
| 2014/0316883 A1 | 10/2014 | Kitts | |
| 2014/0337122 A1 | 11/2014 | Bansal | |
| 2014/0358666 A1 | 12/2014 | Baghaie | |
| 2014/0379428 A1 | 12/2014 | Phansalkar | |
| 2015/0046249 A1* | 2/2015 | Qi | G06Q 30/0242 705/14.41 |
| 2015/0066626 A1 | 3/2015 | Farahat | |
| 2015/0149277 A1 | 5/2015 | Mankoff | |
| 2015/0154632 A1 | 6/2015 | Jindal | |
| 2015/0186925 A1 | 7/2015 | Chittailappilly | |
| 2015/0235261 A1* | 8/2015 | Shulman | G06Q 30/0246 705/14.45 |
| 2015/0237395 A1 | 8/2015 | Barney | |
| 2015/0262221 A1 | 9/2015 | Nakano | |
| 2015/0269606 A1 | 9/2015 | Hewett | |
| 2015/0341684 A1 | 11/2015 | Kitts | |
| 2015/0348119 A1 | 12/2015 | Ferber | |
| 2015/0350706 A1 | 12/2015 | Ferber | |
| 2016/0019582 A1 | 1/2016 | Bindra | |
| 2016/0117355 A1 | 4/2016 | Krishnamurthy | |
| 2016/0134934 A1 | 5/2016 | Jared | |
| 2016/0155141 A1* | 6/2016 | Song | G06Q 30/0242 705/14.41 |
| 2016/0180375 A1 | 6/2016 | Rose | |
| 2016/0210658 A1 | 7/2016 | Chittilappilly | |
| 2016/0210659 A1 | 7/2016 | Chittilappilly | |
| 2016/0225014 A1 | 8/2016 | Mitra | |
| 2016/0239571 A1 | 8/2016 | Rowe | |
| 2016/0358227 A1 | 12/2016 | McAfee | |
| 2017/0034591 A1* | 2/2017 | Ray | G06Q 30/0269 |
| 2017/0091809 A1* | 3/2017 | Liu | H04L 67/22 |
| 2017/0091810 A1 | 3/2017 | McGovern | |
| 2017/0195748 A1 | 7/2017 | Shkedi | |
| 2017/0201374 A1 | 7/2017 | Bosworth | |
| 2017/0223425 A1 | 8/2017 | Kitts | |
| 2017/0228768 A1 | 8/2017 | Saxena | |
| 2017/0238025 A1 | 8/2017 | Riedl | |
| 2017/0257410 A1 | 9/2017 | Gattis | |
| 2017/0323330 A1 | 11/2017 | Chittilappilly | |
| 2017/0330219 A1* | 11/2017 | Feldman | G06Q 30/0243 |
| 2017/0337578 A1 | 11/2017 | Chittilappilly | |
| 2017/0337588 A1 | 11/2017 | Chittilappilly | |
| 2018/0005140 A1 | 1/2018 | Chittilappilly | |
| 2018/0068343 A1 | 3/2018 | Hammock | |
| 2018/0096397 A1* | 4/2018 | Goeldi | G06F 16/685 |
| 2018/0139514 A1 | 5/2018 | Smith | |
| 2018/0152766 A1 | 5/2018 | Kitts | |
| 2018/0192128 A1 | 7/2018 | Manus | |
| 2018/0218383 A1 | 8/2018 | Shen | |
| 2018/0260715 A1 | 9/2018 | Yan | |
| 2018/0285469 A1 | 10/2018 | Hahn | |
| 2018/0308123 A1 | 10/2018 | Zhong | |
| 2018/0338189 A1* | 11/2018 | Ray | H04N 21/25883 |
| 2018/0357678 A1 | 12/2018 | Diorio | |
| 2019/0050891 A1* | 2/2019 | Chung | G06Q 30/0269 |
| 2019/0050893 A1 | 2/2019 | Stuttle | |
| 2019/0087469 A1 | 3/2019 | Zhang | |
| 2019/0104199 A1 | 4/2019 | Rothman | |
| 2019/0138563 A1 | 5/2019 | Odgen | |
| 2019/0141013 A1 | 5/2019 | Mail | |
| 2019/0236639 A1 | 8/2019 | Mitra | |
| 2019/0273961 A1 | 9/2019 | Kitts | |
| 2019/0278378 A1 | 9/2019 | Yan | |
| 2019/0318379 A1 | 10/2019 | Patel | |
| 2019/0378074 A1 | 12/2019 | McPhatter | |
| 2020/0027121 A1 | 1/2020 | Avedissian | |
| 2020/0065854 A1 | 2/2020 | Eberstein | |
| 2022/0086513 A1 | 3/2022 | Swinson | |

OTHER PUBLICATIONS

Notice of Allowance for U.S. Appl. No. 16/363,801, dated Aug. 16, 2021, 7 pgs.

Office Action for U.S. Appl. No. 16/706,061, dated Oct. 25, 2021, 15 pgs.

Kitts, et al., Attribution of Conversion Events to Multi-Channel Media, 2010 IEEE International Conference on Data Mining, pp. 881-886.

Office Action for U.S. Appl. No. 16/705,813, dated Nov. 23, 2021, 23 pgs.

Notice of Allowance for U.S. Appl. No. 16/365,448, dated Oct. 6, 2021, 4 pgs.

Office Action for U.S. Appl. No. 16/363,801, dated Jul. 7, 2020, 19 pgs.

Office Action for U.S. Appl. No. 16/363,801, dated Jan. 15, 2021, 22 pgs.

Bhatia, Tarun, et al., Method and System of Scaling Online-Offline Ad Effectiveness Measurements across Devices in a Network, IP.com Prior Art Database Technical Disclosure, IPCOM000226497D, Apr. 9, 2013, 6 pgs.

Office Action for U.S. Appl. No. 16/705,813, dated Mar. 8, 2021, 15 pgs.

Cleveland, William S., Robust Locally Weighted Regression and Smoothing Scatterplots, Journal of the American Statistical Association, Theory and Methods Section, vol. 74, No. 368, DOI: 10.1080/01621459.1979.10481038, Dec. 1979, pp. 829-836.

Andreas F. Ruckstuhl, et al., Baseline subtraction using robust local regression estimation, Journal of Quantitative Spectroscopy and Radiative Transfer, vol. 68, Issue 2, 2001, pp. 179-193 (ISSN 0022-4073).

Lambert, Diane, et al, Online Effects of Offline Ads, in ADKDD '08: Proceedings of the 2nd International Workshop on Data Mining and Audience Intelligence for Advertising, New York: Association for Computing Machinery, pp. 10-17, 2008.

(56) References Cited

OTHER PUBLICATIONS

Notice of Allowance for U.S. Appl. No. 16/363,801, dated Apr. 28, 2021, 9 pgs.
Advertisement System, Method and Computer Program Product, an IP.com Prior Art Database Technical Disclosure, IPCOM000138557D, Jul. 24, 2006, 40 pgs.
Weng, Chien-I, et al., Did you LINE Today? Strategies for Creating LINE Online to Offline Customer Experiences, 49th Hawaii Int'l Conf. on System Sciences, IEEE Computer Society, 2016, pp. 2136-2145.
Office Action for U.S. Appl. No. 16/706,061, dated May 11, 2021, 18 pgs.
Office Action for U.S. Appl. No. 16/705,813, dated Jun. 21, 2021, 23 pgs.
Gallego, Victor, et al., Assessing the effect of advertising expenditures upon sales: a Bayesian structural time series model, Appl. Stoch. Model. Bus. Ind., 35, 2019, pp. 479-491, at https://doi.org/10.1002/asmb.2460, 21 pgs.
Du, Rex Y., et al., "TV Ads and Search Spikes: Toward a Deeper Understanding," MIS quarterly, Feb. 23, 2017, 35 pgs.
Kitts, Brendan, "Can Television Advertising Impact Be Measured on the Web? Web Spike Response as a Possible Conversion Tracking System for Television," in Proceedings of the Eighth Int'l Workshop on Data Mining on Online, ADKDD'14, Aug. 24-27, 2014, New York, NY, 9 pgs. at http://dx.doi.org/10.1145/2648584.2648591.
Cetintas, Suleyman, et al., Forecasting user visits for online display advertising, Inf Retrieval 16, pp. 369-390, 2013, at https://doi.org/10.1007/s10791-012-9201-4.
Komsta, L., Comparison of Several Methods of Chromatographic Baseline Removal with a New Approach Based on Quantile Regression, Chromatographia 73, 2011, pp. 721-731, at https://doi.org/10.1007/s10337-011-1962-1.
Zhang, Zhi-Min, et al., Baseline correction using adaptive iteratively reweighted penalized least squares, Analyst (www.rsc.org/analyst), 135, 2010, pp. 1138-1146, doi:10.1039/b922045c.
Baek, Sung-June, et al., Baseline correction using asymmetrically reweighted penalized least squares smoothing, Analyst (www.rsc.org/analyst), 140, 2015, pp. 250-257.
Office Action for U.S. Appl. No. 16/365,448, dated Jun. 23, 2021, 8 pgs.
Office Action for U.S. Appl. No. 16/716,161, dated Dec. 9, 2021, 21 pgs.
Notice of Allowance for U.S. Appl. No. 16/706,061, dated Mar. 18, 2022, 7 pgs.
Notice of Allowance for U.S. Appl. No. 16/716,161, dated Mar. 30, 2022, 8 pgs.

\* cited by examiner

| Creative | Name ▽ | Efficiency ▽ | Relative Performance ▲ | Response ▽ | Spend ▽ 40 spots |
|---|---|---|---|---|---|
| | XYZ Concept 2 ver 7 | 60 | 38% | N/A | $22.4k 25% |
| | XYZ Concept 2 ver 4 | 55 | 27% | N/A | $25.4k 29% |
| | XYZ Concept 4 ver 2 | 35 | -19% | N/A | $7.5k 8% |
| | XYZ Concept 4 ver 1 | 30 | -32% | N/A | $8.8k 10% |

SYSTEMS AND METHODS FOR DEBIASING MEDIA CREATIVE EFFICIENCY

CROSS-REFERENCE TO RELATED APPLICATION(S)

This application claims a benefit of priority under 35 U.S.C. § 119(e) from the filing date of U.S. Provisional Application No. 62/647,402, filed on Mar. 23, 2018, entitled "SYSTEMS AND METHODS FOR DEBIASING MEDIA CREATIVE EFFICIENCY," the entire disclosure of which is fully incorporated by reference herein for all purposes.

TECHNICAL FIELD

This disclosure relates generally to data processing for performance analysis. More particularly, this disclosure relates to systems, methods, and computer program products for debiasing media creative efficiency.

BACKGROUND OF THE RELATED ART

With the advent of the Internet, many aspects of modern life are now digitally connected through the seemingly ubiquitous smart phones, smart televisions (TV), smart home appliances, Internet of Things (IoT) devices, websites, mobile apps, etc. Even so, many more analog aspects remain disconnected from this digital world. Linear TV is an example of an offline medium that is disconnected from the digital world.

"Linear TV" refers to real time (live) television services that transmit TV program schedules. Almost all broadcast TV services can be considered as linear TV. Non-linear TV covers streamlining and on-demand programming, which can be viewed at any time and is not constrained by real-time broadcast schedules. Video-on-demand (VOD) and near video-on-demand (NVOD) transmissions of pay-per-view programs over channel feeds are examples of non-linear TV.

Because linear TV is an offline medium, it is not possible to automatically collect information on viewers of linear TV. This creates a data gap problem. To address this data gap program, Nielsen Media Research, an American firm headquartered in New York, N.Y., U.S.A., devised a ratings system, known as the Nielsen ratings, to determine the audience size and composition of television programming in the United States. This determination is based on audience response to TV programs gathered in one of two ways—using viewer diaries or set meters attached to TVs in selected homes. The former requires a target audience self-record their viewing habits. The latter requires a special device to collect specific viewing habits on a minute to minute basis and send the collected information to Nielsen's ratings system over a phone line. Today, Nielsen's ratings system is the primary source of audience measurement information in the television industry. Television networks rely heavily on the Nielsen ratings to decide the value of television shows.

While Nielsen's ratings system can provide some quantified measures of audience response to TV programs, the Nielsen ratings do not measure conversion rates for TV commercials. Accordingly, a typical approach for evaluating the performance of a TV commercial is to define the efficiency (E) of that TV commercial as Response per Amount Spent where E is defined as E=100*lift/(ad spend). In this case, "lift" is a quality metric for measuring a TV commercial in the context of a particular type of campaign—in this case, for measuring how much increase (lift) per $100 ad spend. This approach is generally independent to where and when the TV commercial aired on television networks.

SUMMARY OF THE DISCLOSURE

The approach described above can be troublesome in some cases. For instance, a media creative (which refers to content created for a particular purpose or campaign) can be aired in multiple ad spots, on different television networks (hereinafter "networks"), at different times, under different cost structures. Because linear TV is an offline medium, it is not possible to build an actual rigorous test/design framework that eliminates biases based on digital evidence collected from TV viewers and TV networks. Thus, if the level of efficiency of a media creative (referred to herein as "media creative efficiency") is calculated using the same equation as a single ad spot (i.e., using the aggregated lift and aggregated ad spends), the performance of the media creative will be influenced by the performance of network, time, cost structure, and other factors. These influences represent biases in the data which could lead to a false conclusion.

An object of this disclosure is to provide a solution for debiasing such biases and producing a true media creative efficiency that more objectively quantifies the relative performance of a media creative over other media creatives across multiple networks. According to embodiments, this object can be realized in a quantification system having a media creative performance analyzer configured for debiasing media creative efficiency.

In some embodiments, the media creative performance analyzer leverages a weighted generalized linear model (GLM) to determine the individual impacts of media creatives beyond network effects. To prepare input data for fitting the weighted GLM, the media creative performance analyzer is operable to analyze spot airing data, create a data structure for storing observations (e.g., network-media creative combinations) suitable as input to the weight GLM, and compute additional inputs needed by the weighted GLM (e.g., network spend, media creative efficiency per network-media creative combination, etc.). The weighted GLM is then fitted to obtain a set of coefficients representing the individual impacts of the media creatives. The media creative performance analyzer is further operable to adjust the previously computed media creative efficiency for each media creative utilizing the computed individual impacts. In this way, relative performance of media creatives can be objectively quantified across networks without needing digital evidence.

In some embodiments, a method of debiasing media creative efficiency can include retrieving spot airing data from a database, the spot airing data comprising information on media creatives and networks on which the media creatives aired; determining, based on the spot airing data, a set of media creatives with overlapping networks on which the set of media creatives aired; computing a media creative efficiency for each media creative of the set of media creatives per each network of the overlapping networks; creating a data structure, each entry in the data structure representing a network-media creative combination derived from the set of media creatives and the overlapping networks; modifying the data structure to include a network spend for the each entry; computing a media creative efficiency for the each entry in the data structure; performing a weighted GLM fitting operation over the data structure to obtain impacts of the set of media creatives beyond effects of the overlapping networks; and adjusting the media creative efficiency for the each entry in the data structure utilizing the impacts of the set of media creatives to thereby debias the media creative efficiency for the each entry in the data structure. In some embodiments, categorical values associated with the overlapping networks and/or any factor (e.g., "rotation," "times of day", "geolocation", etc.) under consideration by the media creative performance analyzer are transformed into numerical values prior to performing the weighted GLM fitting operation.

In some embodiments, the method may further comprise determining eligible media creatives for debiasing by creating a definition of nodes representing the media creatives in the spot airing data and edges representing the networks on which the media creatives aired; creating a definition of islands, each island representing a subgraph of the nodes connected directly or indirectly through the edges; determining whether any island is present in the media creatives; and responsive to an island being present in the media creatives, returning a set of nodes associated with the island as the set of media creatives.

In some embodiments, the method may further comprise automatically decoupling datasets in the spot airing data into non-overlapping clusters of groups of networks and media creatives and, for each cluster, performing the weighted GLM fitting operation to obtain individual impacts of media creatives and adjusting a media creative efficiency previously computed for each media creative in the cluster to thereby debias the media creative efficiency for the each media creative in the cluster.

In some embodiments, the method may further comprise generating a visualization for presentation on a user device, the visualization showing the relative performance of different media creatives across the non-overlapping clusters on a per cluster basis. In some embodiments, the visualization may be generated to show the relative performance of the media creatives in only one of the non-overlapping clusters (e.g., the largest cluster). In some embodiments, the visualization may be generated to show the relative performance of all the media creatives in the same campaign across multiple networks.

One embodiment may comprise a system having a processor and a memory and configured to implement the method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 6 depicts a diagrammatic representation of an example of a visualization of debiased media creative efficiencies according to some embodiments.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As alluded to above, while Nielsen's ratings system can provide some quantified measures of audience response to TV programs, the Nielsen ratings do not measure conversion rates for TV commercials. This is, in part, because there is a natural distinction between online data and offline data.

Figure 1:
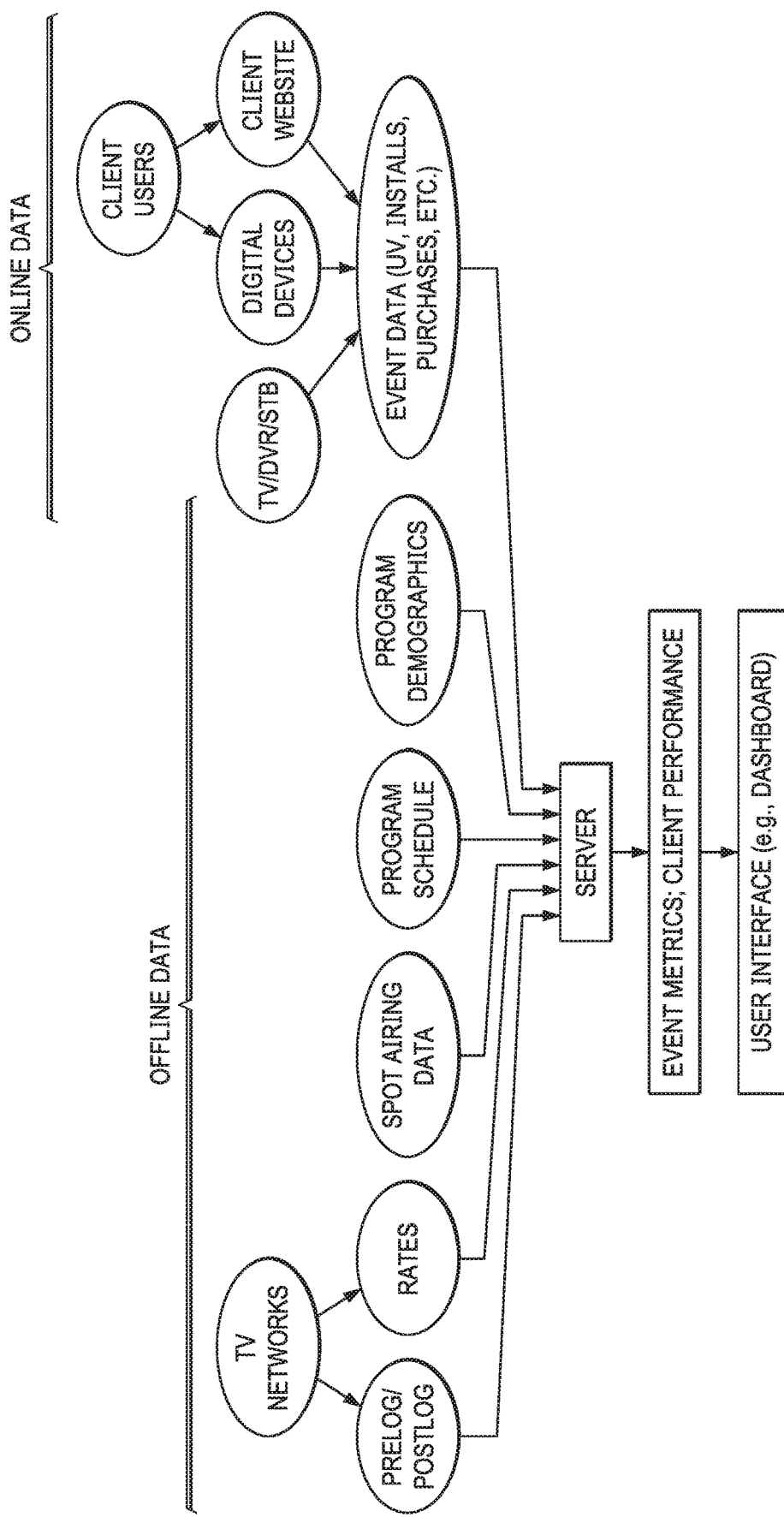
FIG. 1 depicts a diagrammatic representation of a quantification system residing on a network server communicatively connected to a variety of data sources according to some embodiments.

As illustrated in FIG. 1, online data and offline data can come from very different data sources. Further, data aggregated and/or provided by these different data sources can have very different data types. When a TV commercial (which is an example of a media creative) is presented to an audience through an online medium (e.g., a website or a mobile application acting as an advertising channel), the online medium can be an effective tool for a server that is programmed to compute the performance efficiency of that TV commercial. This is because the audience (i.e., potential consumers of a product or service offered by the TV commercial) is already accessing the Internet through the website or the mobile application. When a user is attracted to or interested in the product or service and visits the website or uses the mobile application to access the product or service, there is a session associated with that advertising channel. Thus, whether such a session results in a sale (or conversion) is a relatively straightforward process that can be done through tracking the session at the website or the mobile application (e.g., using a tracking pixel embedded in a page or pages that sends data to a server computer hosting the website or one that is associated with an entity offering the product or service).

The offline medium (e.g., linear TV), on the other hand, aims to drive potential consumers first to the Internet and then to a website or application where a product or service is offered. Unlike the online medium, there is neither session tracking nor a direct relationship between the offline medium and the desired result. Without digital evidence collected from TV viewers and TV networks, it is not possible to directly assess the performance efficiency of a media creative. This disconnect makes it extremely difficult to truly measure the performance of a media creative.

As discussed above, an alternative approach is to define the efficiency (E) of a media creative under evaluation as a measure of lift relative to ad spend where E=100*lift/(ad spend). However, this approach assumes that the performance efficiencies of media creatives, which aired on different television networks, at different times, under different cost structures, are not affected by how, when, or how much they may differ from one another. This assumption could lead to a false conclusion. Table 1 below illustrates this scenario.

TABLE 1

| Network | Average Lift Per Airing | |
|---|---|---|
| | CA | CB |
| NA | 100 | 120 |
| NB | 50 | 60 |
| Efficiency | 9.5 | 6.6 |

Table 1 shows two media creatives (CA, CB) aired on two TV networks (NA, NB). As an example, a "media creative" can refer to a file (e.g., a video, an audio, a multimedia file, etc.) that was created to convey a message and/or for a particular purpose. An "ad spot" or "spot" can refer to a media creative that airs at a particular time on a particular network. In this example, each media creative aired 10 times (10 spots). However, CA aired 9 times on NA and 1 time on NB, while CB aired 1 time on NA, and 9 times on NB. Suppose both NA and NB charges $1000 per airing. Using the standard approach where E=100*lift/(ad spend), the aggregated results are as follows:

Efficiency(CA)=100*total_lift/total_spend=100*
(100*9+50*1)/(10*1000)=9.5

Efficiency(CB)=100*total_lift/total_spend=100*
(120*1+60*9)/(10*1000)=6.6

The calculated results show that CB performed worse than CA (i.e., Efficiency (CB)<Efficiency (CA)). This is because CB aired 90% times on NB and NB provides an average lift per airing that is lower than NA. However, as shown in Table 1, CB actually performs better than CA across any TV network. That is, the TV networks themselves are a factor that can skew the impact of the media creatives that they air, making it extremely difficult to calculate the true performance (e.g., efficiency and effectiveness) of these media creatives.

For an accurate comparison among media creatives, a new solution is needed to account for these differences (e.g., different TV networks, distribution of viewers, etc.) and eliminate biases that may falsely influence TV creative performance analyses. To this end, embodiments disclosed herein provide a solution that can quantitively debias possible biases in spot airing data and compute true media creative efficiency.

Figure 2:
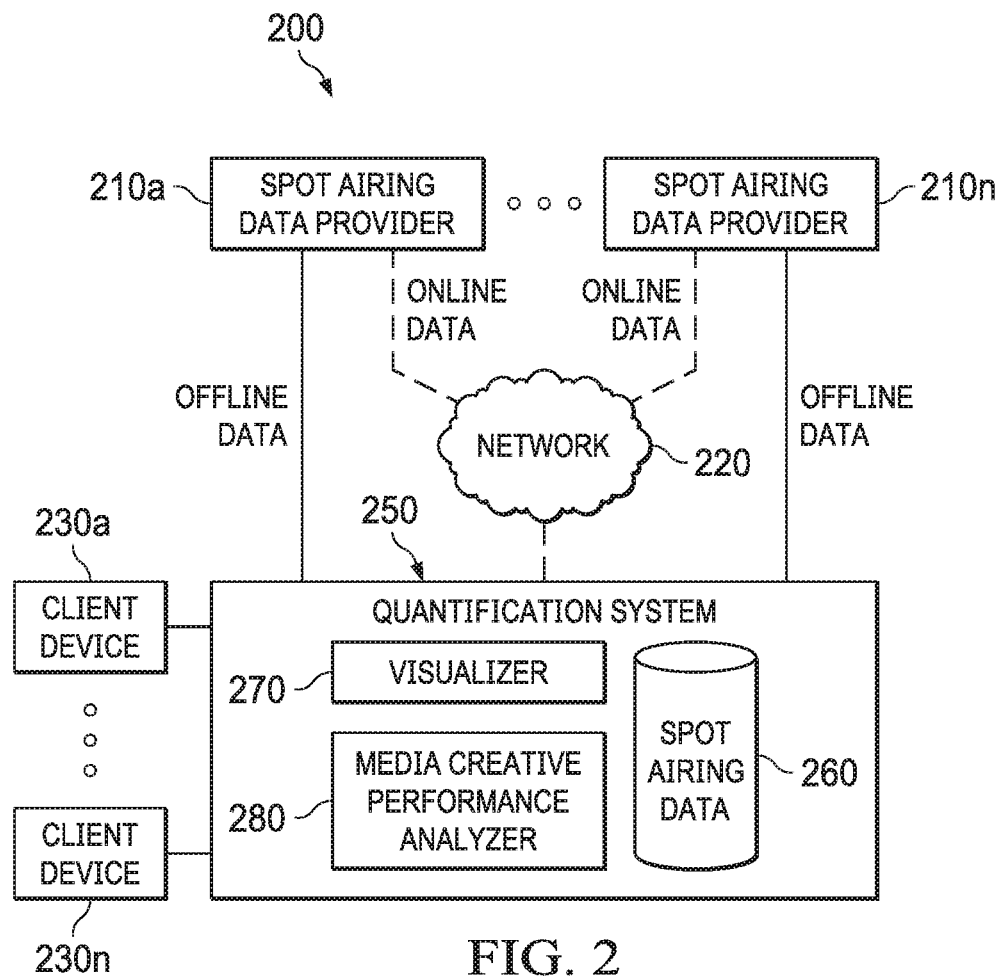
FIG. 2 depicts a diagrammatic representation of a quantification system operating in a network environment according to some embodiments.

As exemplified in FIG. 2, in some embodiments, this solution can be realized in quantification system 250 operating in network environment 200. Quantification system 250 can be communicatively connected to spot airing data providers 210a . . . 210n through analog communication channels (e.g., telephones, mail, couriers, etc.). Quantification system 250 can also be communicatively connected to spot airing data providers 210a . . . 210n over network 220 (e.g., Internet). Examples of spot airing data providers 210a . . . 210n can include TV networks, media agencies, third-party data providers such as a market research firm, etc. Quantification system 250 may be implemented on one or more server machines operated by a media performance analytics service provider. The media performance analytics service provider may purchase spots from TV networks to air media creatives. This relationship may provide quantification system 250 with access to ad spend information which, in turn, enables quantification system 250 to compute efficiency for each media creative per each network. Additionally or alternatively, spot airing data providers 210a . . . 210n can provide online data and/or offline data, as exemplified in FIG. 1. Examples of offline data can include spot airing logs (before and after spots have aired) and rates from TV networks, spot airing data, program schedules, program demographics, etc.

Spot airing data generally includes what and when spots aired and on what network. Often there is not a uniform format of spot airing data received or obtained from spot airing data providers 210a . . . 210n. Quantification system 250 is operable to uniquely identify and store spot airing data per each instance of a spot airing on a particular network at a particular time in spot airing data database 260. In one embodiment, quantification system 250 is operable to perform, where necessary, data cleansing operations such as deduplication, normalization, data format conversion, etc.

In the example of FIG. 2, quantification system 250 further includes media creative performance analyzer 280 and visualizer 270. As described below, media creative performance analyzer 280 is configured for debiasing media creative efficiency so that a more accuracy media creative efficiency can be presented on, e.g., on client devices 230a . . . 230n through a user interface (UI) generated by visualizer 270.

Figure 3:
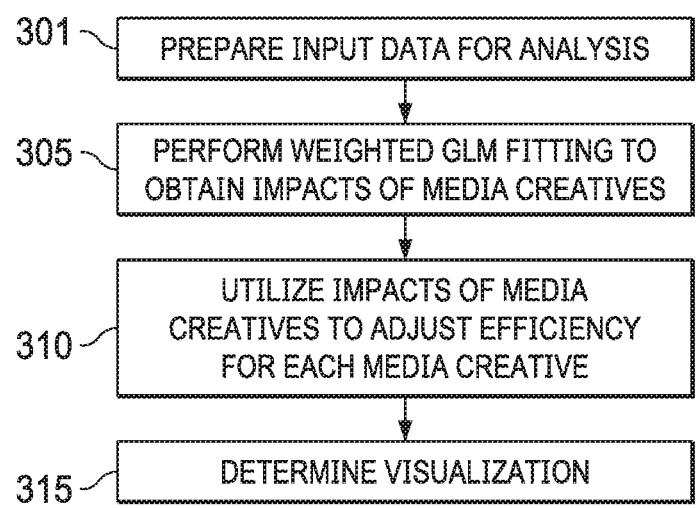
FIG. 3 is a flow chart illustrating a method for debiasing media creative efficiency according to some embodiments.

FIG. 3 is a flow chart illustrating a method for debiasing media creative efficiency. To remove biases from potential factors that may influence or otherwise affect the efficiency among media creatives, the media creative performance analyzer (e.g., media creative performance analyzer 280) implements a new framework which leverages the concept of a weighted generalized linear model (GLM). In statistics, the GLM is a flexible generalization of ordinary linear regression that allows for response variables that have error distribution models other than a normal distribution. The weighted GLM requires an input format that is very different from spot airing data obtained or received by the quantification system (e.g., quantification system 250). Accordingly, in some embodiments, the media creative performance analyzer first prepares input data to the weighted GLM (301). This preparation is further described below with reference to FIGS. 4A and 4B.

Figure 4A:
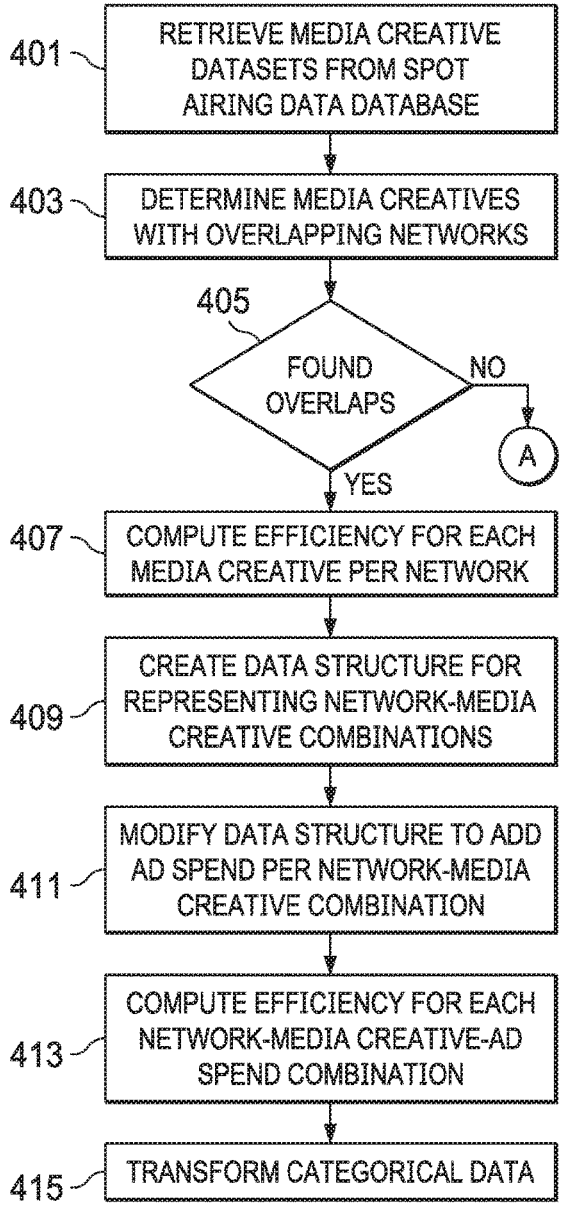
FIG. 4A is a flow chart illustrating a method for preparing input data for analysis according to some embodiments.
Figure 4B:
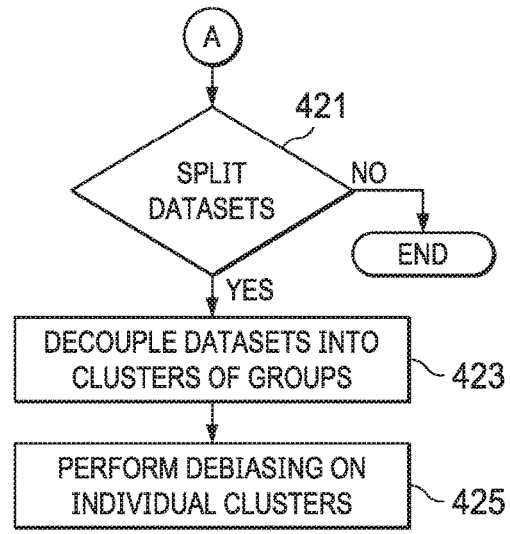
FIG. 4B is a flow chart illustrating a method for handling special cases that may occur in the input data according to some embodiments.

As illustrated in FIG. 4A, preparing input data for analysis can include accessing a spot airing data database (e.g., spot airing data database 260) and retrieving media creative data sets from the spot airing data database (401). As discussed above, each data set can correspond to a spot of a media creative and can include an ad spot identifier (ID), a media creative ID, a time when the spot was aired, on what network the spot was aired, how much the network charged for its airing ("spend"), etc.

In some embodiments, the media creative performance analyzer can include a function for automatically checking and handling decoupled scenarios. In this case, "decoupled" refers to the delineation that seems to divide the media creative data sets. Table 2 below illustrates an example of a decoupled scenario. In the example of Table 2, five media creatives CA-CE aired on five networks NA-NE. These media creatives were created for the same purpose (e.g., for the same TV campaign) and are meant to convey the same message.

TABLE 2

| Network | Media Creative | | | | |
| | CA | CB | CC | CD | CE |
| --- | --- | --- | --- | --- | --- |
| NA | $10K | $3K | 0 | 0 | 0 |
| NB | 0 | $5K | $4K | 0 | 0 |
| NC | $12K | 0 | $10K | 0 | 0 |
| ND | 0 | 0 | 0 | $11K | $8K |
| NE | 0 | 0 | 0 | $7K | $7K |

From Table 2, it can be seen that not all media creatives were aired on each network. In fact, the media creatives and the networks can be generally partitioned along ad spend, as shown in Table 3 below.

TABLE 3

| Network | Media Creative | | | | |
| | CA | CB | CC | CD | CE |
| --- | --- | --- | --- | --- | --- |
| NA | $10K | $3K | 0 | 0 | 0 |
| NB | 0 | $5K | $4K | 0 | 0 |
| NC | $12K | 0 | $10K | 0 | 0 |
| ND | 0 | 0 | 0 | $11K | $8K |
| NE | 0 | 0 | 0 | $7K | $7K |

As a result, a cluster of a group of media creatives (CA-CC) and a group of networks (NA-NC) seems to be separable from another cluster of a different group of media creatives (CD-CE) and a different group of networks (ND-NE). These two clusters have no overlapping networks and/or media creatives in common and thus are considered "decoupled" from one another.

This lack of overlapping network spend between the two decoupled clusters can affect the ability of the media creative performance analyzer to compare relative efficiencies between them. One reason is because the media creative performance analyzer focuses on identifying relative performance on overlapping networks. Accordingly, in some embodiments, the media creative performance analyzer is operable to automatically identify possible decoupled scenarios in the media creative data sets. This can entail determining media creatives that aired on overlapping networks (and thus have network spend values that can be compared) (403). If no overlapping networks could be found in the media creative data sets retrieved from the spot airing data database (405), the media creative performance analyzer may terminate the process (and/or proceed to process the next set of media creative data sets created for another TV campaign) or proceed to FIG. 4B.

If media creatives with overlapping networks can be found, the media creative performance analyzer is operable to determine the efficiency (E) for each media creative per Network (407). In some embodiments, the media creative performance analyzer is operable to create a data structure for storing network-creative combinations (409). In some embodiments, this data structure, which can be created at any appropriate time, is particularly structured for input to a weighted GLM. Before describing this data structure, an example of networks and media creatives under consideration by the media creative performance analyzer at this time may be helpful.

In the example of Table 4, media creative CA aired on network NA once and creative CB aired once on network NA and once on network NB. Here, "network" is the only potential factor. However, it can be generalized to include any potential factors such as "rotation", "times of day", "geolocation", etc.

TABLE 4

| Ad spot ID | Creative ID | Network | Spend | Lift |
| --- | --- | --- | --- | --- |
| 1 | CA | NA | 100 | 50 |
| 2 | CB | NA | 100 | 40 |
| 3 | CB | NB | 200 | 100 |

Using the sample networks and media creatives from Table 4, an example of a new data structure can be created as shown in Table 5 below:

TABLE 5

| Media Creative | Network |
| --- | --- |
| CA | NA |
| CA | NB |
| CB | NA |
| CB | NB |

In some embodiments, this new data structure is specifically created for input to the weighted GLM. In some embodiments, each entry in the data structure represents an observation that is a combination of a network (and/or any factor under consideration) and a media creative (which, in this example, is referred to as a network-media creative combination).

The data structure is then modified to include a column for representing the ad spend per each network-creative combination (411). This is exemplified in Table 6 below.

TABLE 6

| Media Creative | Network | Spend |
| --- | --- | --- |
| CA | NA | ... |
| CA | NB | ... |
| CB | NA | ... |
| CB | NB | ... |

Based on the ad spend per network-media creative combination, the media creative performance analyzer is operable to compute an efficiency for each network-media creative-ad spend combination (413). In some embodiments, with sufficient samples, a network-media creative combination with a "spend" value less than $250 is not considered.

The media creative performance analyzer is further operable to update the data structure to include the computed efficiency for each network-media creative-ad spend combination. This is exemplified in Table 7 below.

TABLE 7

| Media Creative | Network | Efficiency | Spend |
|---|---|---|---|
| CA | NA | . . . | . . . |
| CA | NB | . . . | . . . |
| CB | NA | . . . | . . . |
| CB | NB | . . . | . . . |

In this example, "network" is a factor being considered by the media creative performance analyzer for debiasing. To consider such a factor, which is categorical rather than numerical, the media creative performance analyzer is operable to transform the categorical values for the network factor (and any factor under consideration) to a numerical representation (415), for instance, using one-hot-encoding.

A one-hot-encoding is a representation of categorical variables (e.g., "creative" and "network") as binary vectors. As an example, the categorical values can first be mapped to integer values (e.g., from char values to integer values). Then, each integer value is represented as a binary vector that is all zero values except the index of the integer, which is marked with a 1. This integer encoding can then be converted to a one-hot-encoding of integer encoded values. OneHotEncoder is an example of a one-hot-encoding transformer. One-hot-encoding is known to those skilled in the art and thus is not further described herein. Other categorical-to-numerical transformers may also be used.

Once the data structure storing the input data (e.g., Table 7) is ready for consumption by the weighted GLM, the media creative performance analyzer is operable to perform a weighted GLM fitting operation to obtain the impacts of these media creatives beyond the effects of the factors (e.g., the networks) (305). Here, an objective is to model the expected value of a continuous variable, Y, as a linear function of the continuous predictor, X. To achieve this objective, the weighted GLM is fitted for Y~X, where X is the set of indicators (factors) for networks and creatives, and the weights w represent the dollars spent per network-media creative combination, holding everything else constant. In this way, the weighted GLM can quantify the impact of ad spend on a particular network and the impact of ad spend on a particular media creative.

The concept behind the weighted GLM is to solve for the parameters that minimize the errors using the Ordinary Least Squares (OLS) methodology. Typically, OLS results in equation 1.1 as follows.

$$y = X\beta \text{ is solved as } \beta = (X'X)^{-1}X'y \quad \text{Equation [1.1]}$$

For the weighted GLM, the matrix algebra adjusts this equation and solves the OLS as follows:

$$wy = wX\beta, \text{ where } w \text{ is the weighting vector}$$

Thus, a solution using matrix algebra provides the following:

$$(X'wX)\beta = X'wy$$

$$(X'wX)^{-1}(X'wX)\beta = (X'wX)^{-1}X'wy$$

and, as $(X'wX)^{-1}(X'wX) = 1$, this results in equation 1.2 as follows:

$$\beta = (X'wX)^{-1}X'wy \quad \text{Equation [1.2]}$$

Fitting the weighted GLM over the input data prepared by the media creative performance analyzer produces coefficients on the media creatives under consideration in the form of betas ($\beta$). These coefficients reflect the impacts of the media creatives beyond network effects.

To debias and correct any difference caused by the "network" factor, each impact can then be utilized to adjust/correct the efficiency computed for each media creative (310). In some embodiments, with the coefficients from the weighted GLM fitting operation, each media creative's actual airing efficiency is converted into an adjusted efficiency based on a hypothetical airing of spots to ensure that the same distribution of network spend is used per media creative. In this way, the efficiencies of different media creatives will be comparable to each other.

In some embodiments, the media creative performance analyzer may determine how results from the media creative performance analysis should be visualized or otherwise presented on UIs (315). In some embodiments, the media creative performance analyzer may provide the results to a visualizer (e.g., visualizer 270) of the quantification system (e.g., quantification system 250) disclosed herein. In turn, the visualizer may operate to determine how the results should be presented to users.

For instance, as discussed above, in some cases, media creatives created for the same TV campaign may have no or not enough network overlaps (405). However, as illustrated in Table 3, it is possible that pockets or clusters of network-media creative combinations could be found in some subsets or "islands" of the media creative datasets under consideration (421).

In some embodiments, finding eligible media creatives for debiasing may include the following steps. First, a definition of nodes and edges is created. Nodes represent media creatives. Edges represent the networks on which the media creatives (nodes) are aired. Next, a definition of "islands" is created. In the concept of graphs, "islands" represent subgraphs where all the media creatives are connected directly or indirectly through other media creatives. Media creatives that are eligible for debiasing should belong to the same "island" (subgraph). Media creatives in different islands cannot be compared. Thus, debiasing can only be performed per island.

If such islands can be found, the datasets can be decoupled into non-overlapping clusters of groups of networks and media creatives (423). Within each cluster, the input data to the weighted GLM can be prepared (301), the weighted GLM can be fitted to obtain individual media creative impacts (305), and the computed media creative impacts can be utilized to adjust the media creative efficiency (310) as described above. As the number of networks increases and the number of creatives expands as well, the decoupling can be much more complex, with many different 'islands' of disparate network-media creative clusters.

These different scenarios can be visualized depending upon use case. For instance, instead of showing negative relative performance for media creatives having no or not enough network overlaps, a "not applicable" or "N/A" message can be displayed. As another example, the results can be visualized separately for each distinct cluster. An alternative embodiment might be to present results for the largest cluster (e.g., most spend).

Figure 5:
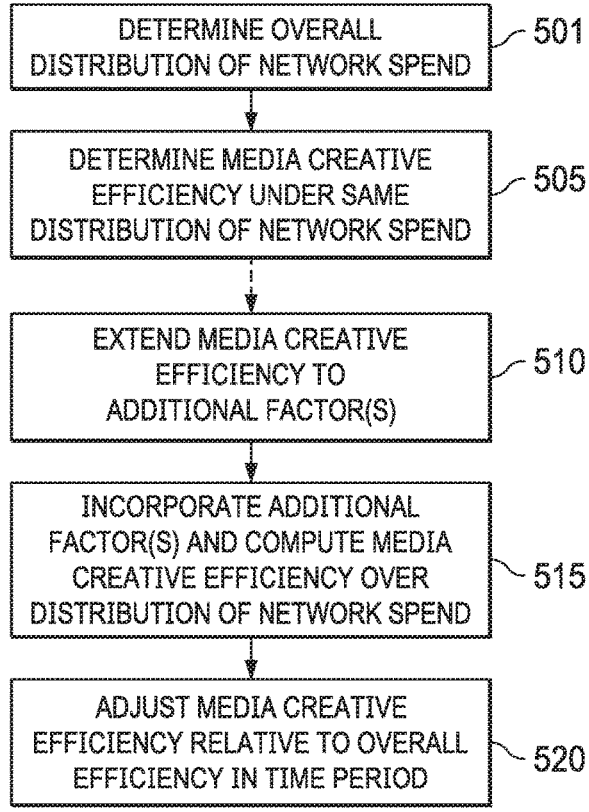
FIG. 5 is a flow chart illustrating a method for converting impacts of media creatives to adjusted efficiency for each media creative according to some embodiments.

Other visualization configurations may also be possible. For instance, a user may wish to utilize the media creative efficiency debiasing solution disclosed herein to make immediate, urgent decisions near real time (e.g., when a TV network has a fire sale of inventory spots). Such a user may be a representative of a media agency that produces media creatives or any entity that wishes to increase the efficiency and effectiveness of media creatives. As an example, the user may access a UI generated and provided by a visualizer (e.g., visualizer 270) of the quantification system (e.g., quantification system 250) disclosed herein. The visualizer may operate to compute the percentage of dollars spent per network over a time period. FIG. 5 is a flow chart that illustrates this process.

In this example, for every network, i, there is an associated spend percentage, sp(i). Whatever time period the user has selected through the user interface on the user's device (e.g., client device 230*a*), the visualizer is operable to compute and present a distribution of network spend corresponding to that time period (501).

For instance, if a budget is spent on three TV networks, NA, NB, and NC, during a certain time period, the server computer is operable to compute the percentage of dollar spend for each TV network. Suppose, in this example, the distribution of network spend is as follows: sp(NA)=0.5, sp(NB)=0.32, sp(NC)=0.18. The media creative efficiency is computed under same spending distribution (505). Accordingly, the projected efficiency equation for a given time period becomes:

$$efficiency = 1.0 \times \beta(0) + \sum_{i=1}^{N_{network}} \beta(i) \times sp(i) + \sum_{j=1+N}^{N+m_{creative}} \beta(j) \times sp(j)$$

Here, the spend percentage, sp(i), is plugged in for each of the networks and media creatives. Note that this is a no-interaction case for networks and media creatives only. This can be extended to additional factor(s) (510) such as rotations, with no-interaction, as follows:

$$efficiency = 1.0 \times \beta(0) + \sum_{i=1}^{N_{network-rotation}} \beta(i) \times sp(i) + \sum_{j=1+N}^{N+m_{creative}} \beta(j) \times sp(j)$$

In some embodiments, the methodology can be extended to rotations along with incorporation of interaction effects as follows:

$$efficiency = 1.0 \times \beta(0) + \sum_{i=1}^{N_{network-rotation}} \beta(i) \times sp(i) +$$

$$\sum_{j=1+N}^{N+m_{creative}} \beta(j) \times sp(j) + \sum_{i=1}^{N_{network-rotation}} \sum_{j=1+N}^{N+m_{creative}} \beta(i,j) \times sp(i,j)$$

Referring back to the no-interaction case for networks and media creatives only, the next step is to incorporate the network spend percentages in the input data and apply the weighted GLM to obtain each media creative efficiency (515). This can be done for creatives 1 . . . k where creative(k) is an indicator for the kth media creative. Thus, for two media creatives 1 and 2, their respective sp(i) can be incorporated in the weighted GLM to obtain the impact of the media creative with the computed spend distribution.

$$efficiency(creative\ 1) =$$
$$1.0 \times \beta(0) + \sum_{i=1}^{N_{network}} \beta(i) \times sp(i) + creative(1) \times \beta(N+1)$$

$$efficiency(creative\ 2) =$$
$$1.0 \times \beta(0) + \sum_{i=1}^{N_{network}} \beta(i) \times sp(i) + creative(2) \times \beta(N+2)$$

The above calculated media creative efficiency can then be adjusted and/or normalize to a media creative efficiency over a time period (520). Here, the total efficiency (efficiency$_{tot}$) is defined as the total lift for the time period divided by the total spend for that time period:

$$efficiency_{tot} = lift_{tot}/spend_{tot}$$

The overall efficiency can be calculated by summing up the weighted creative efficiencies. The percentage of network spend can then be determined for each media creative.

$$overalleffcalc = \sum_{i=1}^{n_{creative}} efficiency(creative\ k) \times sp(k)$$

This computation can be adjusted by the ratio of the total efficiency to the computed creative efficiency. This normalizes the value for the adjusted media creative efficiency.

$$efficiency_{adj}(creative\ k) = efficiency(creative\ k) \times (efficiency_{tot}/overalleffcalc)$$

In this way, the relative performance of each media creative in the presence of differences in spend per network (and time aired or daypart) can be isolated and, in some cases, presented to users over a network. Because these computations can be performed on the fly based on a real time data feed, results from the computations can be provided to users in near real time to assist in urgent decision making processes, saving time while providing a visualization of possible outcomes from such decisions. Additionally, embodiments disclosed herein improve the granularity of offline performance analyses from the network level to the media creative level.

FIG. 6 depicts an example of UI 600 showing individual creative efficiencies with their relative performance indicators. In this example, each creative efficiency is represented by a numerical value that is computed by the media creative performance analyzer using the media creative debiasing methodology described above. This provides an accurate, unbiased, and quantified measure of effectiveness of each media creative in near real time, which is otherwise not possible for an offline medium. Historically, media agencies have no visibility on performance of creatives. Embodiments disclosed herein can bridge the data gap between the online world and the offline world, bringing offline processes into the real time decision making with accurate calculation. Another technical benefit provided by the detailed, creative level of performance analysis is that debiased creative efficiencies can be leveraged to optimize operations down to individual rotations of creatives based on the cost per sale for each of those.

Figure 7:
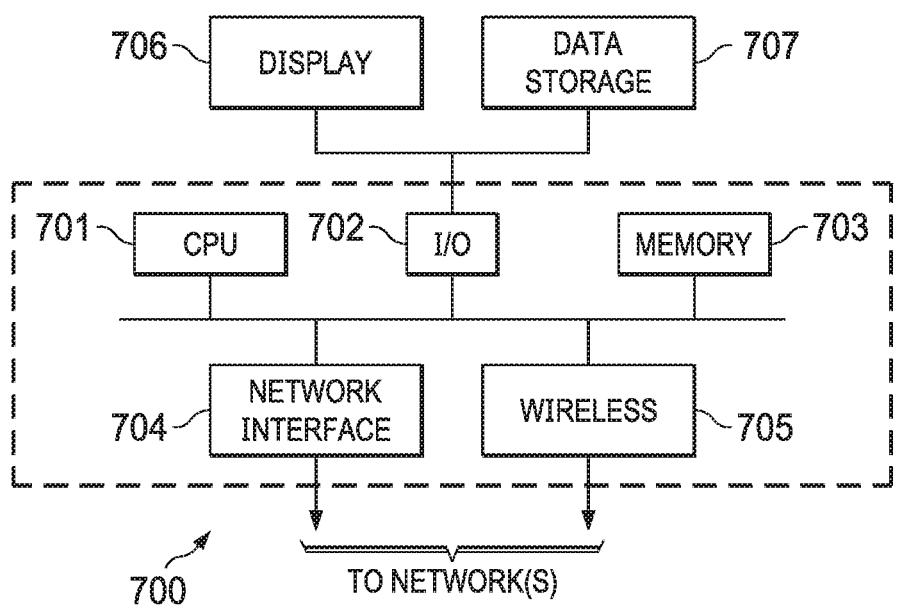
FIG. 7 depicts a diagrammatic representation of a data processing system for implementing a system according to some embodiments.

FIG. 7 depicts a diagrammatic representation of a data processing system for implementing a system for processing messages. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including Python. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise. The scope of the present disclosure should be determined by the following claims and their legal equivalents.

What is claimed is:

1. A method for debiasing media creative efficiency, comprising:
   retrieving, by a computer, offline data from a database, the offline data including spot airing data comprising information on media creatives and networks on which the media creatives aired through linear television, the information containing biases due to a plurality of factors including differences in the networks and audiences of the networks;
   creating, by the computer, a graph representing the media creatives connected via the networks;
   determining, by the computer based at least on the media creatives and the networks in the spot airing data, a subgraph of the graph, the subgraph representing a plurality of media creatives with overlapping networks on which the plurality of media creatives aired so as to allow for a media creative performance analysis;
   conducting, by the computer, the media creative performance analysis on the plurality of media creatives, the media creative performance analysis comprising:
   computing a media creative efficiency for each media creative of the plurality of media creatives per each network of the overlapping networks;
   creating a data structure for input to a weighted generalized linear model (GLM), wherein each entry in the data structure represents a network-media creative combination derived from the plurality of media creatives and the overlapping networks in the subgraph;
   modifying the data structure to include a network spend for each network-media creative combination;
   computing a media creative efficiency for each respective network-media creative-network spend combination in the data structure, wherein the media creative efficiency is defined in terms of an incremental lift in unique visitors to a website per the network spend on the respective network-media creative combination; and
   performing a weighted GLM fitting operation over input data in the data structure to obtain quantified impacts of the plurality of media creatives beyond effects of the overlapping networks and the differences in the networks and the audiences of the networks;
   adjusting, by the computer, the media creative efficiency for each network-media creative-network spend combination in the data structure utilizing the quantified impacts of the plurality of media creatives to thereby debias the media creative efficiency for each network-media creative-network spend combination in the data structure; and
   presenting, by the computer through a user interface, results from the adjusting, the presenting including generating a visualization for displaying the results on the user interface, the results including the plurality of media creatives and corresponding debiased media creative efficiencies as adjusted and stored in the data structure.

2. The method according to claim 1, wherein determining the plurality of media creatives further comprises determining eligible media creatives for debiasing, comprising:
   creating a definition of nodes representing the media creatives in the spot airing data and edges representing the networks on which the media creatives aired;
   creating a definition of islands, each island representing a subgraph of the nodes connected directly or indirectly through the edges;
   determining whether any island is present in the media creatives; and
   responsive to an island being present in the media creatives, returning a set of nodes associated with the island as the plurality of media creatives.

3. The method according to claim 1, further comprising:
   prior to performing the weighted GLM fitting operation, transforming categorical values associated with the overlapping networks into numerical values.

4. The method according to claim 1, further comprising:
   automatically decoupling datasets in the spot airing data into non-overlapping clusters of groups of networks and media creatives; and
   for each cluster, performing the weighted GLM fitting operation to obtain individual impacts of media creatives and adjusting a media creative efficiency previously computed for each media creative in the cluster to thereby debias the media creative efficiency for the each media creative in the cluster.

5. The method according to claim 4, further comprising:
generating a visualization for presentation on a user device, the visualization showing relative performance of media creatives across the non-overlapping clusters.

6. The method according to claim 4, further comprising:
generating a visualization for presentation on a user device, the visualization showing relative performance of media creatives in one of the non-overlapping clusters.

7. The method according to claim 1, further comprising:
generating a visualization for presentation on a user device, the visualization showing relative performance of the set of media creatives.

8. A system for debiasing media creative efficiency, comprising:
a processor;
a non-transitory computer-readable medium; and
stored instructions translatable by the processor for:
retrieving offline data from a database, the offline data including spot airing data comprising information on media creatives and networks on which the media creatives aired through linear television, the information containing biases due to a plurality of factors including differences in the networks and audiences of the networks;
creating a graph representing the media creatives connected via the networks;
determining, based at least on the media creatives and the networks in the spot airing data, a subgraph of the graph, the subgraph representing a plurality of media creatives with overlapping networks on which the plurality of media creatives aired so as to allow for a media creative performance analysis;
conducting the media creative performance analysis on the plurality of media creatives, the media creative performance analysis comprising:
computing a media creative efficiency for each media creative of the-plurality of media creatives per each network of the overlapping networks, wherein the media creative efficiency is defined in terms of an incremental lift in unique visitors to a website per dollar spent on a respective media creative;
creating a data structure for input to a weighted generalized linear model (GLM), wherein each entry in the data structure represents a network-media creative combination derived from the plurality of media creatives and the overlapping networks in the subgraph;
modifying the data structure to include a network spend for the each network-media creative combination;
computing a media creative efficiency for each respective network-media creative-network spend combination in the data structure, wherein the media creative efficiency is defined in terms of an incremental lift in unique visitors to a website per the network spend on the respective network-media creative combination; and
performing a weighted GLM fitting operation over input data in the data structure to obtain quantified impacts of the plurality of media creatives beyond effects of the overlapping networks and the differences in the networks and the audiences of the networks;
adjusting the media creative efficiency for each network-media creative-network spend combination in the data structure utilizing the quantified impacts of the plurality of media creatives to thereby debias the media creative efficiency for each network-media creative-network spend combination in the data structure; and
presenting, through a user interface, results from the adjusting, the presenting including generating a visualization for displaying the results on the user interface, the results including the plurality of media creatives and corresponding debiased media creative efficiencies as adjusted and stored in the data structure.

9. The system of claim 8, wherein determining the plurality of media creatives further comprises determining eligible media creatives for debiasing, comprising:
creating a definition of nodes representing the media creatives in the spot airing data and edges representing the networks on which the media creatives aired;
creating a definition of islands, each island representing a subgraph of the nodes connected directly or indirectly through the edges;
determining whether any island is present in the media creatives; and
responsive to an island being present in the media creatives, returning a set of nodes associated with the island as the plurality of media creatives.

10. The system of claim 8, wherein the stored instructions are further translatable by the processor for:
prior to performing the weighted GLM fitting operation, transforming categorical values associated with the overlapping networks into numerical values.

11. The system of claim 8, wherein the stored instructions are further translatable by the processor for:
automatically decoupling datasets in the spot airing data into non-overlapping clusters of groups of networks and media creatives; and
for each cluster, performing the weighted GLM fitting operation to obtain individual impacts of media creatives and adjusting a media creative efficiency previously computed for each media creative in the cluster to thereby debias the media creative efficiency for the each media creative in the cluster.

12. The system of claim 11, wherein the stored instructions are further translatable by the processor for:
generating a visualization for presentation on a user device, the visualization showing relative performance of media creatives across the non-overlapping clusters.

13. The system of claim 11, wherein the stored instructions are further translatable by the processor for:
generating a visualization for presentation on a user device, the visualization showing relative performance of media creatives in one of the non-overlapping clusters.

14. The system of claim 8, wherein the stored instructions are further translatable by the processor for:
generating a visualization for presentation on a user device, the visualization showing relative performance of the set of media creatives.

15. A computer program product for debiasing media creative efficiency, the computer program product comprising a non-transitory computer-readable medium storing instructions translatable by a processor for:
retrieving offline data from a database, the offline data including spot airing data comprising information on media creatives and networks on which the media creatives aired through linear television, the information containing biases due to a plurality of factors including differences in the networks and audiences of the networks;

creating a graph representing the media creatives connected via the networks;

determining, based at least on the media creatives and the networks in the spot airing data, a subgraph of the graph, the subgraph representing a plurality of media creatives with overlapping networks on which the plurality of media creatives aired so as to allow for a media creative performance analysis;

conducting the media creative performance analysis on the plurality of media creatives, the media creative performance analysis comprising:

computing a media creative efficiency for each media creative of the plurality of media creatives per each network of the overlapping networks;

creating a data structure for input to a weighted generalized linear model (GLM), wherein each entry in the data structure represents a network-media creative combination derived from the plurality of media creatives and the overlapping networks in the subgraph;

modifying the data structure to include a network spend for the each network-media creative combination;

computing a media creative efficiency for each network-media creative-network spend combination in the data structure, wherein the media creative efficiency is defined in terms of an incremental lift in unique visitors to a website per the network spend on the respective network-media creative combination; and performing a weighted GLM fitting operation over input data in the data structure to obtain quantified impacts of the plurality of media creatives beyond effects of the overlapping networks and the differences in the networks and the audiences of the networks;

adjusting the media creative efficiency for each network-media creative-network spend combination in the data structure utilizing the quantified impacts of the plurality of media creatives to thereby debias the media creative efficiency for each network-media creative-network spend combination in the data structure; and presenting, through a user interface, results from the adjusting, the presenting including generating a visualization for displaying the results on the user interface, the results including the plurality of media creatives and corresponding debiased media creative efficiencies as adjusted and stored in the data structure.

16. The computer program product of claim 15, wherein determining the plurality of media creatives further comprises determining eligible media creatives for debiasing, comprising:

creating a definition of nodes representing the media creatives in the spot airing data and edges representing the networks on which the media creatives aired;

creating a definition of islands, each island representing a subgraph of the nodes connected directly or indirectly through the edges;

determining whether any island is present in the media creatives; and responsive to an island being present in the media creatives, returning a set of nodes associated with the island as the plurality of media creatives.

17. The computer program product of claim 15, wherein the instructions are further translatable by the processor for:

automatically decoupling datasets in the spot airing data into non-overlapping clusters of groups of networks and media creatives; and for each cluster, performing the weighted GLM fitting operation to obtain individual impacts of media creatives and adjusting a media creative efficiency previously computed for each media creative in the cluster to thereby debias the media creative efficiency for the each media creative in the cluster.

18. The computer program product of claim 17, wherein the instructions are further translatable by the processor for:

generating a visualization for presentation on a user device, the visualization showing relative performance of media creatives across the non-overlapping clusters.

19. The computer program product of claim 17, wherein the instructions are further translatable by the processor for:

generating a visualization for presentation on a user device, the visualization showing relative performance of media creatives in one of the non-overlapping clusters.

20. The computer program product of claim 15, wherein the instructions are further translatable by the processor for:

generating a visualization for presentation on a user device, the visualization showing relative performance of the set of media creatives.

\* \* \* \* \*